UNITED STATES PATENT OFFICE.

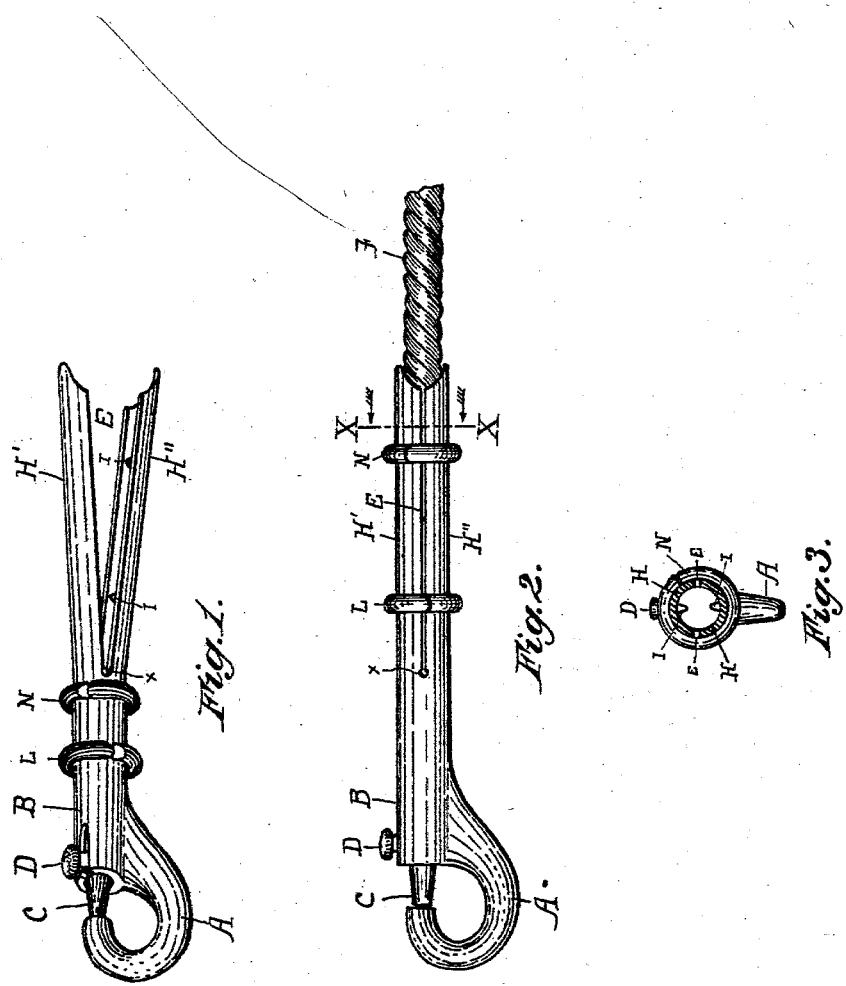

EDWARD PEELLE, OF INDIANAPOLIS, INDIANA.

FASTENING DEVICE.

SPECIFICATION forming part of Letters Patent No. 720,735, dated February 17, 1903.

Application filed May 29, 1902. Serial No. 109,517. (No model.)

*To all whom it may concern:*

Be it known that I, EDWARD PEELLE, a citizen of the United States, residing at Indianapolis, in the county of Marion and State of Indiana, have invented new and useful Improvements in Fastening Devices, of which the following is a specification, which is a full, clear, and exact description of the invention, such as will enable others skilled in the art to which it appertains to make and use the same.

My invention relates to fastening devices designed especially for securing the ends of ropes, straps, or the like to tools or devices—as, for instance, snap-hooks; and the object of my invention is, broadly speaking, to provide an arrangement whereby snap-hooks or the like may be secured to the ends of ropes or straps without the use of buckles and in a neat, secure, and attractive manner.

Another object is the provision of a fastening device of new and novel construction, neat and attractive in appearance, strong and durable in its construction, capable of a wide scope of usefulness and efficiency, and which can be made and sold at a comparatively low price; and still another object is to provide a fastening device for permanently securing snap-hooks or the like to the ends of ropes or the like which may be quickly and easily attached with a minimum of time and labor devoted thereto.

Other objects and advantages will appear from the following specification and from the drawings forming a part thereof, as hereinafter referred to.

The invention consists in the arrangement and combination of the several parts, as illustrated in the drawings and hereinafter fully described, and specifically pointed out in the claim terminating this specification.

For a detail description of the invention I will now refer to the accompanying drawings, in which—

Figure 1 is a side elevation of a snap-hook embodying my invention, showing its clamping members open to receive the end of a rope between them. Fig. 2 is a view of the same, showing the clamping members closed and secured in contact to a section of rope; and Fig. 3 is a cross-section of same, taken on the line X X of Fig. 2 in the direction of the arrow.

Similar letters of reference denote and refer to like parts throughout the several views.

In the drawings, A represents a snap-hook; B, the barrel; C, the plunger operating in the barrel, and D the knob secured to the plunger and by which the plunger is operated to and fro in the barrel. These parts, I am aware, are old and are shown simply to illustrate the manner my invention may be used in connection therewith.

As shown in Figs. 1 and 2, the barrel B extends to the right a distance, and its right portion is divided by a slot E, cut longitudinally from the right end and centrally to the point $x$, forming the two clamping members H' and H''. These members H' and H'' are formed of comparatively thin metal, being integral parts of the snap-hook A, and when their jaws are brought parallel, as in Fig. 2, they form a circular barrel of a size sufficient to tightly clamp upon the rope F.

Extending from the inner wall of the members H' and H'' into the space between said members are pairs of oppositely-disposed spurs I, which are integral parts of the members H' and H'', and these spurs are adapted to sink into the rope, which may be clamped between said members.

It will now be apparent that should a snap-hook or the like be manufactured embodying the construction above referred to, substantially as shown in Fig. 1, with the members H' and H'' slightly sprung apart, as shown, the end of a rope or the like may be inserted between said members, so that the end of the rope will reach to the point $x$ and that the members H' and H'' may then be brought toward each other, the spurs I thus being embedded in the rope, and thus clamping the rope in the manner shown in Fig. 2.

In order to securely hold the members H' and H'' tightly in engagement with the rope F, I provide two rings L and N, adapted to encircle said members at substantially the points shown in Fig. 2. These rings L and N may be solid or endless and can be placed around the barrel B loosely before the members H' and H'' are sprung apart, as shown in Fig. 1, and then driven to place after the rope F has been inserted; but I prefer that the said rings should be open rings and to bend them around the members H' and H'' by power after said members have been clamped to the rope. By this arrangement it will be seen that the rope F will be securely fastened between the members H' and H'', as shown in Fig. 2.

The essential features of my invention are that I provide a divided tubular shank, consisting of the members H' and H'', extending out from and parallel to the barrel of a snap-hook or the like adapted to receive therein a rope or the like, the rope being held in place by a plurality of oppositely-disposed spurs I, held in engagement with the rope by the rings L and N.

From the above description it will be seen that I have produced an improved fastening device embodying the objects above referred to in this specification.

While I have illustrated and described the best means now known to me for carrying out my invention, I wish it to be understood that I do not restrict myself to the exact details of construction shown, but hold that any slight changes or variations in such details as would suggest themselves to the ordinary mechanic would clearly fall within the limit and scope of my invention.

Having now fully shown and described my invention and the best mode for its construction to me known at this time, what I claim as new, and desire to secure by Letters Patent of the United States, is—

An implement, a tubular cylindrical extension from the shank of said implement, longitudinally split sufficiently to allow its parts to open and having internal teeth, in combination with a ring or rings encircling the said shank and adapted to be slipped on the split extension for compressing the same on the rope substantially as set forth.

In testimony whereof I have hereunto signed my name in the presence of two subscribing witnesses.

EDWARD PEELLE.

Witnesses:
W. O. MICHAELS,
A. L. RICHARDSON.